US007924690B2

(12) United States Patent
Hyot et al.

(10) Patent No.: US 7,924,690 B2
(45) Date of Patent: Apr. 12, 2011

(54) PROCESS FOR INTENTIONAL DETERIORATION OF THE CONTENTS OF AN OPTICAL RECORDING MEDIUM

(75) Inventors: Bérangère Hyot, Eybens (FR); Bernard Andre, Quaix En Chartreuse (FR); Pierre Desre, Meylan (FR); Ludovic Poupinet, Sassenage (FR); Patrick Chaton, Theys (FR)

(73) Assignee: Commissariat A l'Energie Atomique (FR)

( * ) Notice: Subject to any disclaimer, the term of this patent is extended or adjusted under 35 U.S.C. 154(b) by 293 days.

(21) Appl. No.: 12/060,439

(22) Filed: Apr. 1, 2008

(65) Prior Publication Data
US 2008/0259778 A1 Oct. 23, 2008

(30) Foreign Application Priority Data

Apr. 6, 2007 (FR) ...................... 07 02562

(51) Int. Cl.
*G11B 7/00* (2006.01)
(52) U.S. Cl. ....................... 369/121; 369/100
(58) Field of Classification Search .................. 369/121
See application file for complete search history.

(56) References Cited

U.S. PATENT DOCUMENTS

| 6,404,722 | B1 * | 6/2002 | Tseng et al. | 369/112.01 |
| 2005/0254408 | A1 | 11/2005 | Hwang et al. | |
| 2006/0046013 | A1 * | 3/2006 | Bae et al. | 428/64.4 |
| 2007/0003872 | A1 * | 1/2007 | Kim et al. | 430/270.11 |

FOREIGN PATENT DOCUMENTS
FR 0700938 2/2007
JP 07029206 1/1995

OTHER PUBLICATIONS

Masaki Yamamoto et al. "Super-Resolution Optical Disc with High Readout Stability Using a Zinc Oxide Thin Film." Japanese Journal of Applied Physics, vol. 43, No. 7B, 2005, pp. 4959-4963, XP007903495.

* cited by examiner

*Primary Examiner* — Aristotelis Psitos
(74) *Attorney, Agent, or Firm* — Lowe Hauptman Ham & Berner, LLP

(57) ABSTRACT

The invention relates to the field of optical information recording. In order to prevent abusive or fraudulent use of storage media, the invention provides a process for intentional degradation of information by application of a laser power below the normal power for reading information recorded in super-resolution on the media. This process relies on the surprising observation that a laser power below the super-resolution read power produces an irreversible degradation of the information recorded. This observation has been made with regard to media composed of a three-layer structure comprising an InSb or GaSb layer between two ZnS/SiO$_2$ layers. Application for protecting sensitive data.

9 Claims, 2 Drawing Sheets

PROCESS FOR INTENTIONAL DETERIORATION OF THE CONTENTS OF AN OPTICAL RECORDING MEDIUM

RELATED APPLICATIONS

The present application is based on, and claims priority from, French Application Number 07 02562, filed Apr. 6, 2007, the disclosure of which is hereby incorporated by reference herein in its entirety.

FIELD OF THE INVENTION

The invention relates to the field of optical information recording.

BACKGROUND OF THE INVENTION

In this field, it may be advantageous to provide recording media which can be neutralized irreversibly, for example, for limiting the number of read accesses in the case where it is desired to prevent an unauthorized use of the recorded data. In particular, in the optical disk (CDROM, audio CD, DVD, etc.) memory, irreversible erasing of the data or of some of the data may serve to protect against unauthorized copying of the information contained in the memory.

Optical data are, in principle, stored on the medium in the form of physical marks which are irregularities of control dimensions which present an optical contrast allowing them to be read by a laser beam detection system.

The physical marks may be impressions formed by molding a polycarbonate substrate (for example, DVD-ROM); they are then recorded once and for all; they may also be formed by recorded zones in layers that are sensitive to the action of a writing light beam; the recording may then be reversible (erasure is possible, even re-recording) or irreversible (no erasure possible nor overwriting).

Typically, in the case of an irreversible optical recording, the recording is carried out by irradiating, by means of a laser diode, a colored layer which is locally degraded when the power of the writing laser exceeds a threshold. This local degradation defines marks whose length is defined by the time during which the laser acts on the rotating disk, taking into account the rotational speed of this disk.

For rewritable disks, the writing is usually carried out by heating a material known as a "phase change material" using a writing laser diode. The material is, for example, initially in a crystalline phase; it locally changes into an amorphous state where the writing laser acts. The optical contrast (for example, in reflectivity) between the amorphous zones and the zones that remain crystalline is sufficient to enable the reading of information thus recorded. Erasing is carried out by again exposing these zones, via the laser diode, to a power greater than the power of the read laser but lower than the power of the laser for writing information. The zones that had become amorphous recrystallize, those that were crystalline remain crystalline, and the disk is ready for a new writing operation.

When it is sought to increase the density of information recorded on an optical disk, this objective is generally limited by the performance of the information read device. The basic principle is that the physical information written to the disk can only be read with great difficulty when its size is smaller than the resolution limit of the optical system which will be used to read this information. Typically, when reading with a red laser having a wavelength of 650 nm and a numerical aperture of 0.6, there is normally no hope of correctly reading information having a resolution below 0.4 microns, or at the limit 0.3 microns.

However, methods known as super-resolution methods have been devised for reading information whose physical size is smaller than, or even much smaller than, the wavelength. These methods are based on the non-linear optical properties of certain materials. The expression "non-linear properties" is understood to mean the fact that certain optical properties of the material change depending on the intensity of the light which they receive. The read laser itself will locally modify the optical properties of the material by thermal, optical, thermooptical and/or optoelectronic effects on dimensions smaller than the dimension of the read laser spot; due to the change in properties, a piece of information present in this very small volume becomes detectable whereas it would not have been detectable without this change.

The phenomenon which is exploited is mainly based on two properties of the read laser that will be used:
  on the one hand, the laser is very highly focused so as to have an extremely small cross section (of the order of the wavelength) but whose power distribution is Gaussian, very strong at its center, very attenuated at the periphery; and
  on the other hand, a read laser power is chosen such that the power density over a small part of the cross section, at the center of the beam, significantly modifies an optical property of the layer, whereas the power density outside of this small cross section portion does not significantly modify this optical property; the optical property is modified in a direction that tends to allow the reading of information which would not be readable without this modification.

Everything then takes place as if a beam had been used that was focused on a diameter much smaller than that which its wavelength allows.

In a previous patent application, filed under the number FR 0700938 on 9 Feb. 2007, an optical storage structure was proposed operating in super-resolution. This structure comprises a substrate (preferably made of polycarbonate) equipped with physical marks whose geometrical configuration defines the information recorded, a superposition of three layers on top of the substrate marks, and a transparent protective layer on top of this superposition, the superposition comprising a layer of indium or gallium antimonide inserted between two dielectric layers of a zinc sulfide and silicon oxide ($ZnS/SiO_2$) compound.

This structure is favorable because it requires a relatively low read laser power to read the super-resolution information with a satisfactory signal/noise ratio. However, the question of the reading power is critical as, on the one hand, a sufficiently high power is necessary to obtain a super-resolution effect via a localized change of the optical properties, but, on the other hand, too high a power tends to gradually destroy the information recorded, limiting the number of read cycles possible whereas a number of read cycles that is as high as possible is desired.

By carrying out tests on these structures based on InSb or GaSb between two $ZnS/SiO_2$ layers, it was surprisingly observed that it was possible, at the same time:
  to read correctly, without them degrading, the information recorded in super-resolution, by using a read laser with a first power $P1$; and
  to irreversibly degrade the information recorded in super-resolution by reading them with a power $P2$ less than $P1$.

This observation was made from repeated measurements on samples comprising regularly distributed marks, recorded in super-resolution.

Although this phenomenon has not been able, to date, to be adequately explained scientifically, the repetition of the observations has led to the conclusion that it would be possible to use this phenomenon industrially to neutralize, at will and irreversibly, the working contents of an optical disk recorded in super-resolution. The neutralization consists of a degradation of certain zones (determined or randomly distributed) that renders the disk unusable.

SUMMARY OF THE INVENTION

Consequently, a process is proposed according to the invention for intentional degradation of information recorded in super-resolution in a high-resolution optical information storage structure, the structure comprising a substrate equipped with physical marks whose geometrical configuration defines the information recorded, a superposition of three layers on top of the substrate marks, and a transparent protective layer on top of this superposition, the superposition comprising a layer of indium or gallium antimonide inserted between two dielectric layers of a zinc sulfide and silicon oxide ($ZnS/SiO_2$) compound, the process comprising a degradation operation consisting in making a laser beam, which has a power around 30% lower than the power of the read laser used to read the information recorded in super-resolution on the disk, pass over the physical marks.

As an example of use, it may be anticipated that the storage structure must not be read more than N times, and that the read system activates, after the $N^{th}$ reading, the application of a lower reading power which degrades sensitive information zones of the structure. The number N moreover may be contained in the structure itself and read by the system in order to activate a power modification of the read laser suitable for carrying out the desired degradation. When the storage structure is rewriteable, it is even possible to record therein the number of readings already carried out in order to manage the desired moment for the intentional degradation.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Figure 1:
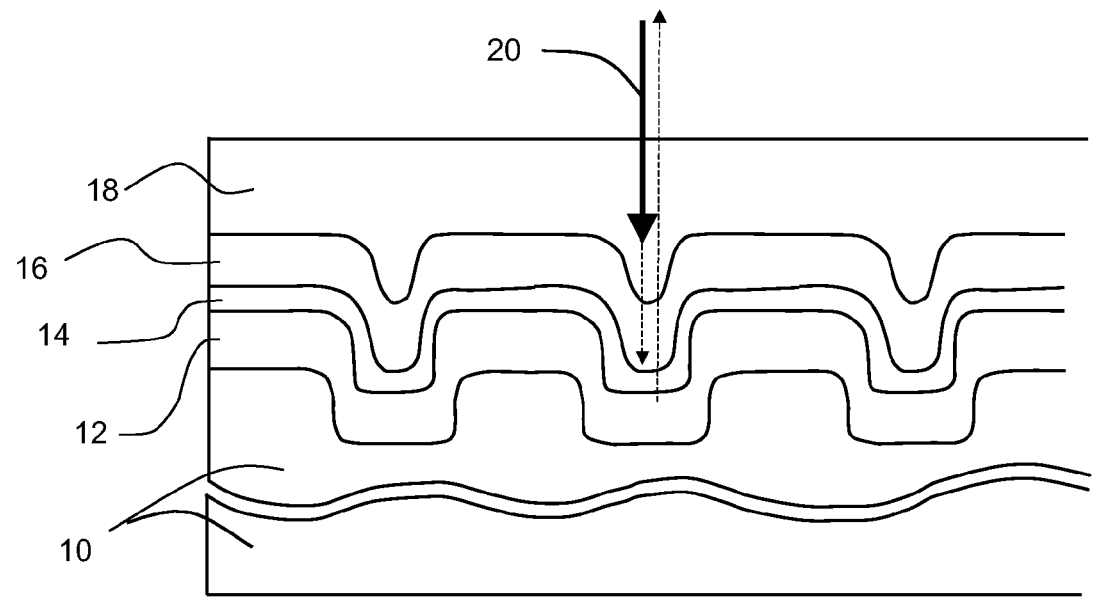
FIG. 1 represents the optical information storage structure used for implementing the invention.

In FIG. 1, the general structure of the optical information storage medium used for implementing the invention is represented.

It comprises a substrate 10, which is preferably an organic material, and notably polycarbonate conventionally used for optical disks. The substrate will, in practice, be in flat disk form and the information is conventionally written onto the disk along substantially concentric tracks; a read laser beam, symbolized by the arrow 20, placed in front of the disk will see the information pass in front of it during the rotation of the disk.

The substrate 10 comprises physical marks that define the recorded information, and in this example, the physical marks are constituted in the form of a relief imprinted on the upper surface of the substrate. The relief is, for example, composed of pits whose width is more or less fixed for all the information written, but whose length and spacing, in the run direction of the information, define the contents of the written information. Reading of the information is carried out by analysis of the phase of the laser beam reflected by the structure, a phase which varies at the start and at the end of the pass by each physical mark. The pits may be prerecorded by pressing of the polycarbonate or of the plastic substrate for example using a nickel mold which has been produced from very high-resolution electron-beam etching tools.

The width, length, and spacing of the physical marks may be less than the theoretical optical resolution of the optical read system which will be used to read them. Typically, when it is a blue laser with a wavelength of around 400 nanometers, used with a focusing optic whose numerical aperture is 0.85, the theoretical physical resolution limit is around 120 nanometers when precautions are taken. Here, the marks may be prerecorded with a resolution, in the length or in the spacing, of less than or equal to 80 nanometers as will be seen.

The marks are covered with three layers composed, in order, of a dielectric layer 12 of $ZnS/SiO_2$ compound, a layer 14 of indium antimonide (InSb) or gallium antimonide (GaSb), and a dielectric layer 16 of $ZnS/SiO_2$ compound. The assembly is covered by a transparent protective layer 18.

The layer 14 made of InSb or GaSb is a layer having non-linear optical properties, and it has been observed that the reflexivity of the three-layer structure, GaSb or InSb layer surrounded by the two $ZnS$—$SiO_2$ dielectric layers, may increase very substantially when it is illuminated by a laser beam having a power of 1 to 2 milliwatts (in practice, corresponding to a power density of around 7 milliwatts per square micron).

Figure 2:
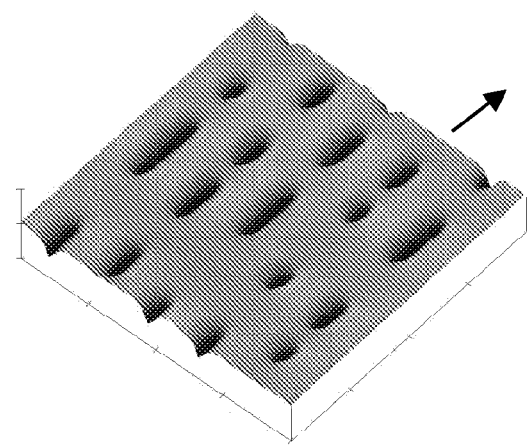
FIG. 2 represents an atomic force microscope view of a substrate in which marks have been preformed having multiple dimensions of 80 nanometers spaced apart at multiple distances of 80 nanometers.

FIG. 2 recalls the manner in which the information prerecorded onto the substrate may be constituted, before deposition of the superposition of three layers 12, 14, 16: blind holes of variable length and spacing. The arrow indicates the run direction of the substrate under the read laser.

The tests carried out have shown that the optimal thicknesses of the layers according to the invention are the following:

lower $ZnS/SiO_2$ layer: from 20 to 100 nanometers, preferably around 50 to 70 nanometers;

GaSb or InSb layer: from 10 to 50 nanometers, preferably around 20 to 30 nanometers; and upper $ZnS/SiO_2$ layer: from 20 to 100 nanometers, preferably around 50 to 60 nanometers.

The preferred atomic composition for the $ZnS$—$SiO_2$ compound is around 80% ZnS per 20% $SiO_2$. It may range from an 85/15 ratio to a 70/30 ratio.

The atomic composition of the InSb or GaSb layer is preferably around 45% to 55% antimony Sb; the proportion of indium or of gallium is then between 45% and the balance of the antimony proportion from 100%. An $In_{50}Sb_{50}$ or $Ga_{50}Sb_{50}$ stoichiometric compound is particularly suitable, but small deviations from stoichiometry are acceptable.

The deposition of the layers does not pose any particular problems; it may be carried out conventionally by sputtering from a target comprising the materials in question, both for the active layer and for the dielectrics, or by plasma-enhanced vapor deposition.

The invention is particularly applicable for reading information from a blue laser, typically with a wavelength of around 400 nanometers, the information prerecorded onto the optical disk possibly then having a resolution of 100 nanometers or less, that is to say four or five times less than the read wavelength.

The reading of the information will preferably be carried out using a read laser power of around 1.5 to 2 milliwatts. The wavelength of the laser is preferably around 400 nanometers. The focusing optic has a numerical aperture of around 0.85.

The voluntary degradation of the information will be carried out using a laser similar to the read laser, or the read laser itself, with a similar focusing optic or with the reading optic itself, but with a reduced laser power. The reduced power will be around 30% lower than the read power. When the laser being used to provide the intentional degradation of the information is the read laser itself, it will be operated with a lower supply current and/or voltage during the degradation operation than during the super-resolution reading operation.

The degradation may notably be observed by taking measurements of fluctuations in the length of the marks present in the output signal relative to the reference time period ("jitter" measurement) of the output signal. The reference time period is, for example, the time T corresponding to a reference distance of 80 nm scanned by the read laser beam during rotation of the disk. The degree of regularity of the marks read is measured as a ratio (as a percentage) of the periods actually detected in the read signal to the theoretical period of the signal, and it may be considered that the information recorded is degraded when the periodic fluctuation measured exceeds 10% whereas the information is precisely periodic on the disk. This is because, when the fluctuation exceeds 10%, sampling of the signal at the frequency 1/T, in order to detect the presence or absence of the marks, has a not-inconsiderable probability of giving a false result.

The practical measurement method consists in compatibilizing the durations of the successive recorded marks, determined from the output signal of the read head, and in establishing a histogram thereof (number of marks located having one length or another), then in determining the standard deviation of the length, this standard deviation representing the fluctuation relative to the reference time. The calculation may optionally be made by taking into account the fluctuations in the rotational speed of the recording medium when its rotational speed is not perfectly regular.

It is observed that reading at low powers (below 1 mW) gave a low fluctuation relative to the reference time, less than 10% (the super-resolution information not however being able to be seen at a low power);

the information read at a relatively high power for which the super-resolution effect applies, mainly around 1.5 to 2 milliwatts gives a low fluctuation, below 10%;

the information read at a medium power (around 1.2 to 1.5 milliwatts, mainly around 30% less than the read power in super-resolution), gives a high fluctuation, which may reach close to 20%; and after reading at medium power, the super-resolution information could no longer be read by reestablishing the normal read power in super-resolution; it was affected by a high fluctuation, greater than 10% and this was observed repeatedly; the information is irretrievably degraded, the degradation being measured by a jitter value; observation with an atomic force microscope confirmed the fact that the recorded marks had deteriorated.

The observation was repeated multiple times, on structures that were different from one another and both when the phase change layer was indium antimonide and when it was gallium antimonide.

The tests were made on the following structures, given in the table below in which:

the lower $ZnS/SiO_2$ layer 12 deposited on the polycarbonate substrate 10 is denoted by layer C1;

the phase change layer 14 made of InSb or GaSb by layer C2;

the upper $ZnS/SiO_2$ layer 16 is denoted by layer C3;

the normal read laser power in super-resolution is denoted by P1; and the power at which degradation was observed, irreversibly preventing reading in super-resolution is denoted by P2.

| Layer C1 $ZnS/SiO_2$ | Layer C2 InSb or GaSb | Layer C3 $ZnS/SiO_2$ | Read power P1 | Degradation power P2 |
|---|---|---|---|---|
| 75 nm | InSb 20 nm | 40 nm | 1.3 mW | 0.9 mW |
| 75 nm | InSb 20 nm | 50 nm | 1.5 mW | 1.0 mW |
| 75 nm | InSb 20 nm | 70 nm | 1.9 mW | 1.3 mW |
| 75 nm | InSb 20 nm | 80 nm | 2 mW | 1.4 mW |
| 75 nm | GaSb 20 nm | 50 nm | 2 mW | 1.5 mW |

The irreversible degradation process according to the invention is useful for limiting the number of accesses to a recorded media, or for limiting the abusive or fraudulent use of the recorded data.

Figure 3:
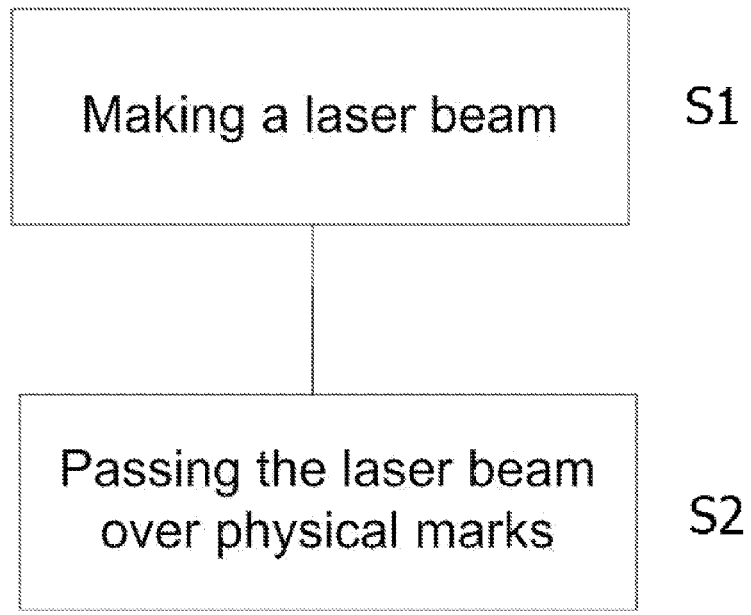
FIG. 3 illustrates a process of degration according to the embodiment disclosed in the application.

FIG. 3 shows that the process of the degradation operation according to the disclosed embodiment. The degradation operation includes a step S1 of making a laser beam, and a step S2 of passing over physical marks.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A process for intentional degradation of information recorded in super-resolution in a structure for optical storage of high-resolution information, the structure comprising:

a substrate equipped with physical marks whose geometrical configuration defines the information recorded, a superposition of three layers on top of the substrate marks, and a transparent protective layer on top of this superposition, the superposition comprising a layer of indium or gallium antimonide inserted between two dielectric layers of a zinc sulfide and silicon oxide (ZnS/$SiO_2$) compound, the process comprising a degradation operation consisting in making a laser beam, which has a power around 30% lower than the power of the read laser used to read the information recorded in super-resolution on the disk, pass over the physical marks.

2. The process as claimed in claim 1, wherein the read laser is a blue laser with a wavelength of around 400 nanometers, with a power of around 1.5 to 2 milliwatts, and the degradation laser is also a blue laser.

3. The process as claimed in claim 2, wherein the degradation laser is the read laser operating with a lower supply current and/or voltage.

4. The process as claimed in claim 1, wherein the atomic proportions of antimony in the antimonide layer are from 45% to 55%, the proportion of indium or of gallium being between 45% and the balance of the antimony proportion from 100%.

5. The process as claimed in claim 1, wherein the thickness of the InSb or GaSb antimonide layer is from 10 to 50 nanometers.

6. The process as claimed in claim 1, wherein the thickness of the InSb or GaSb antimonide layer is from 20 to 30 nanometers.

7. The process as claimed in claim 1, wherein the ZnS/SiO2 dielectric layers each have a thickness between 20 and 100 nanometers.

8. The process as claimed in claim 1, wherein the atomic proportion of ZnS and of SiO2 is taken from the range between ZnS85 at %/SiO2 15 at % (85/15 ratio) and ZnS70 at %/SiO2 30 at % (70/30 ratio).

9. The process as claimed in claim 2, wherein the atomic proportions of antimony in the antimonide layer are from 45% to 55%, the proportion of indium or of gallium being between 45% and the balance of the antimony proportion from 100%.

* * * * *